(12) United States Patent
Schliwa-Bertling et al.

(10) Patent No.: US 7,873,378 B2
(45) Date of Patent: Jan. 18, 2011

(54) METHOD OF REDUCING DELAY IN PUSH-TO-TALK OVER CELLULAR (POC) BY PREDICTING NEED FOR CONNECTION SETUP

(75) Inventors: Paul Schliwa-Bertling, Linköping (SE); Hans Hannu, Luleå (SE); Tomas Jönsson, Luleå (SE); Jan Christoffersson, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 715 days.

(21) Appl. No.: 10/556,684

(22) PCT Filed: Dec. 22, 2003

(86) PCT No.: PCT/SE03/02048
§ 371 (c)(1),
(2), (4) Date: Sep. 26, 2006

(87) PCT Pub. No.: WO2004/102997
PCT Pub. Date: Nov. 25, 2004

(65) Prior Publication Data
US 2007/0123284 A1    May 31, 2007

Related U.S. Application Data

(60) Provisional application No. 60/469,833, filed on May 13, 2003.

(51) Int. Cl.
*H04B 7/00* (2006.01)

(52) U.S. Cl. .......... 455/519; 455/518; 455/69; 455/90.2; 370/342; 370/328; 370/329; 370/338

(58) Field of Classification Search .......... 455/516–521, 455/458, 509; 370/260, 352, 389, 312, 328, 370/342, 348, 390, 401, 441
See application file for complete search history.

(56) References Cited

U.S. PATENT DOCUMENTS 6,360,093 B1    3/2002  Ross et al.

(Continued)

FOREIGN PATENT DOCUMENTS

WO    00/74410    12/2000

OTHER PUBLICATIONS

International Search Report for PCT/SE2003/002048 dated Mar. 10, 2004.

(Continued)

*Primary Examiner*—Kamran Afshar
*Assistant Examiner*—Chuong A Ngo
(74) *Attorney, Agent, or Firm*—Nixon & Vanderhye, P.C.

(57) ABSTRACT

The present invention relates to a method of reducing setup delay for an uplink message from a user terminal (UT) in a delay sensitive service in a radio telecommunications system, such as a push to talk service (PoC), by predicting that delay sensitive data is about to be transmitted, sending, as a response to the prediction, a connection setup signal from the terminal to a basestation subsystem (BSS) in order to set up an early uplink radio connection, and transmitting the delay sensitive data via the early uplink connection. There is also provided a user terminal (UT) and a radio telecommunications system.

19 Claims, 6 Drawing Sheets

U.S. PATENT DOCUMENTS

| | | |
|---|---|---|
| 6,792,273 B1 | 9/2004 | Tellinger et al. |
| 6,907,245 B2 | 6/2005 | Ohlsson et al. |
| 7,570,952 B2 | 8/2009 | Woxberg et al. |
| 2002/0150092 A1 | 10/2002 | Bontempi et al. |
| 2003/0016632 A1 | 1/2003 | Refai et al. |
| 2004/0121791 A1* | 6/2004 | May et al. .................... 455/519 |
| 2004/0219925 A1* | 11/2004 | Ahya et al. ................. 455/450 |
| 2004/0224710 A1* | 11/2004 | Koskelainen et al. ........ 455/518 |

OTHER PUBLICATIONS

Chandler et al., *Protocol enhancements for SATCOM DAMA military standards*, Tactical Communications Conference, 1996., Proceedings, Apr. 30, 1996, XP010201857.

Korean Office Action mailed Mar. 12, 2010 in corresponding Korean application 10-2005-7021594.

* cited by examiner

METHOD OF REDUCING DELAY IN PUSH-TO-TALK OVER CELLULAR (POC) BY PREDICTING NEED FOR CONNECTION SETUP

This application is the US national phase of international application PCT/SE2003/002048 filed 22 Dec. 2003, which designated the U.S. and claims priority to U.S. Provisional Application Ser. No. 60/469,833 filed 13 May 2003, the entire contents of each of which are hereby incorporated by reference.

FIELD OF THE INVENTION

The present invention relates to a method of reducing user experienced delay in a delay sensitive service in a radio telecommunications system, such as a Push-to-talk over Cellular (PoC) service.

BACKGROUND

Currently an open standard for a service called Push-to-talk over Cellular (PoC) or Instant-Talk-over-Cellular (IToC) is developed, which service will be applied in terminals in cellular telecommunications systems such as GSM, EDGE, UMTS and CDMA systems. A list of abbreviations is provided at the end of the specification.

Push-to-talk over Cellular (PoC) is basically a "walkie-talkie" service in a cellular telecommunications system. PoC enabled terminals will most likely be equipped with a PoC-button. This PoC button may either be a designated hardware button, one of the existing buttons in the standard keypad or a software controlled button, eg. a button defined on a pressure sensitive display or the like. When this button is pressed the terminal instantly connects you to a friend, a family member or a group of people of your choice, that is no number taking is required. Like a "walkie-talkie" the PoC service is half-duplex, although full duplex may be available at a later stage of development. It is important to have low setup delay in order to allow for the user to start speaking immediately after pressing the button.

FIG. 1 shows an example of the setup of a PoC service architecture in a general telecommunications network 1 comprising a PoC server 2 that administers the PoC service. The PoC server 2 is located in a service network 3, which is associated with a number of Core Networks (CN) 4 each comprising a Service GPRS Support Node 5 (SGSN) and a Gateway GPRS Support Node 6 (GGSN). At least one Radio Access Network 7 (RAN) in turn comprising at least one Base Station Subsystem 8 (BSS), is associated with each core network, which RAN communicates with a number of User Terminals (UT1-UT5) via suitable radio telecommunications protocols. As described above, the PoC service allows half-duplex messages from one user terminal to one or more other terminals in a simple manner.

FIG. 2 shows a more detailed illustration of the setup of a PoC service architecture. The different arrows indicate different types of messages that are sent in the service. The PoC service comprises a PoC server 2 that administers media transfer, a group/list manager server 9 that administers group/contacts handling, a presence server 10, and an IP Multimedia Subsystem core 11 (IMS) that administers session control signalling with the user terminal UT.

The IMS is a system for supporting IP based multimedia services, comprising a Home Subscriber Server (HSS), and at least one Call Session Control Function (CSCF). The HSS maintains the subscriber profile for the CS (Circuit Switched) domain, PS (Packet Switched) domain and IP Multimedia Subsystem. The CSCF in turn provides the IP multimedia basic SIP session handling. It has three functional roles—a "service CSCF" (S-CSCF), an "interrogating CSCF" (I-CSCF) and a "proxy CSCF" (P-CSCF). The P-CSCF is the first point of contact for the mobile station. It proxies the SIP messages towards the home network for the subscriber. The P-CSCF may perform number internationalisation, and it may enforce policy in the GGSN relating the handling of the bearer traffic for IP multimedia. The I-CSCF is the entry point to the home network. The other networks will use a Domain Name Server (DNS) to route the messages to the home network, which will lead the SIP signalling to the I-CSCF. The I-CSCF contacts the HSS to gain the address of the S-CSCF and forwards the SIP messages to the S-CSCF. The S-CSCF is the SIP proxy which provides the access to the operator provided services to the end-user.

FIG. 3 shows an example of a PoC communication (early media setup) between a user 1 and a user 2 where user 1 is the originating part. In the figure each arrow indicates a message and its direction. As is indicated above BSS 8 is a base station subsystem and CN 4 is a core network. For clarity reasons the telecommunications network in FIG. 3 has been divided into two parts, an originating side and a terminating side, respectively; however the BSS 8 and CN 4 on the terminating side may be the same as the BSS 8 and CN 4 on the originating side. UT1 is the terminal of user 1 and UT2 the terminal of user 2. Throughout the application, actions relating to the PoC service are marked with bold reference numbers. The PoC service is initiated in that user 1 selects one or more communication partners or receivers in his/her PoC contacts list, action step 20. Thereafter user 1 pushes the PoC button, process step 21, and the terminal UT1 sends a PoC (floor) request signal 22 to the PoC server 2 via the BSS and the CN. If the PoC service is available (the floor is free), i.e. no one of the receivers already has initiated a PoC message, then the PoC server sends a PoC response signal 23 to UT1 which indicates that UT1 may send a PoC message to selected receivers (in this case user 2). UT1 alerts user 1 that the transmission can be affected and that he/she can begin to talk, action step 24. The message 25 is speech coded and packeted into user data packets (Ud packets) 26 that are sent to the PoC server for distribution to the selected receivers.

On the terminating side, UT2 first receives a PoC request 27 indicating a PoC message 28 from user 1. User 2 accepts the PoC message by pressing an accept button 29 or the like which triggers a PoC accept message 30 from U12. As a response to the PoC accept message 30 the PoC server forwards the PoC message 26 from user 1. When user 2 has received the message 31, 32 he/she may choose to make a response 33 to the message. A response from user 2 is initiated by pushing the PoC button 33 on UT2 whereby a PoC request 34 is sent to the PoC server, just like when the communication first was initiated by user 1. When the PoC server receives the PoC request, it checks if the session (floor) is free, i.e. no one else in the same PoC group already has submitted a PoC request. Obviously, there will be no problem to receive a positive PoC response 35 in the present situation with only two users involved, but in PoC groups with a plurality of users, a user might have to send several PoC requests 34 before he/she will receive a positive PoC response 35 and the possibility to send a reply message 37 to the other users in the group. The remaining steps 38 to 44 in FIG. 3 are performed in the same manner as above.

In an alternative PoC communication setup called "late media" the steps 27 to 30 are performed between the steps 22 and 23. In this setup, user 2 is located and alerted before user 1 is allowed to submit his/her message.

Due to the facts that: the service is delay sensitive, the service is run over a non real time system, and that the amount of signalling is significant, system delay becomes a critical issue. As different types of delays in this type of service add up, it is of great importance to minimize all sources of delay so that the total perceived delay is as low as possible. Even delays in the order of 100 ms become important to reduce.

One contribution to these delay times originates from setting up radio connections between the user terminals and the Base Station sub-System (BSS) and vice versa. Before any data can be transmitted over the air interface in the mobile communication systems, states must be established in the user terminals and in the base stations, and so called radio bearers need to be set up. For example, in the GSM/GPRS system a radio connection referred to as Temporary Block Flow (TBF) must be established between the user terminal and the BSS in order for data to be exchanged. The TBF includes e.g. allocation of time slots. The TBF in the direction user terminal to BSS is referred to as uplink TBF (UL TBF) and in the reverse direction, BSS to user terminal, the TBF is referred to as downlink TBF (DL TBF).

Today there are means to delay the tear down of the TBFs, which are usually tore down when there is no data in the sending buffers located in the terminal or in the BSS, so called TBF prolonging. The prolonging of the DL TBF is referred to as Delayed Release of DL TBF, and the prolonging of the UL TBF is referred to as Extended UL TBF Mode. This prolonging reduces delay times for setting up a new radio connection when new data is placed in the sending buffer shortly after it was emptied.

Further, there exists a feature called Early Setup of a DL TBF. When approaching the end of an UL TBF the BSS will setup a DL TBF even if there is no data in the sending buffer of the BSS and will prolong this TBF for a while. So when new data arrives from a Core Network, the TBF is in place and a delay due to setting up of a radio connection is avoided.

SUMMARY

Obviously an improved method, a user terminal and a radio telecommunications system are needed, which are arranged to minimize the user experienced delay in a delay sensitive service in a radio telecommunications system operating over channels intended mainly for non-delay sensitive traffic. In particular such an improved method, a user terminal and a radio telecommunications system are needed in a PoC service operating over channels that are not dedicated for PoC traffic.

An object of the technology disclosed herein is to provide a method, user terminal and radio telecommunications system that overcomes the drawbacks of the prior art techniques.

In a wide sense the technology disclosed herein solves this problem by reducing set up delays for setting up uplink radio communication from the user terminal to the basestation subsystem, by predicting that delay sensitive PoC data is to be transmitted, in response to the prediction sending a connection setup signal from the terminal to the basestation subsystem to set up an early uplink radio connection, and transmitting the delay sensitive PoC data via the early uplink connection.

One advantage afforded by the technology disclosed herein is that the user experienced setup delay during a PoC service is significantly reduced.

Another advantage afforded by the technology disclosed herein is that it solely involves the functionality of the user terminal whereby such user terminals can be utilized in existing PoC services without any special adaptations of the service.

Yet another advantage is that the technology disclosed herein achieves reduced delay at a low cost, both with regards to the configuration of the user terminal and to the extra load on the radio telecommunications network.

Other objects, advantages and novel features of the technology disclosed herein will become apparent from the following detailed description when considered in conjunction with the accompanying drawings and claims.

BRIEF DESCRIPTION OF THE FIGURES

The features and advantages of the present invention outlined above are described more fully below in the detailed description in conjunction with the drawings where like reference numerals refer to like elements or steps throughout the figures.

DETAILED DESCRIPTION OF THE INVENTION

Embodiments of the technology disclosed herein will now be described with reference to the figures.

As discussed above there is a great risk that the users of a PoC service may experience a delay during a PoC conversation. Setting up of an uplink radio connection is, as discussed above, a process that is not instantaneous and therefore implies a delay in a PoC service. The technology disclosed herein significantly reduces this delay by setting up an early uplink radio connection before user delay sensitive information is to be transmitted. Such an early uplink radio channel is set up by predicting that delay sensitive PoC data is to be transmitted, and sending an connection setup signal from the terminal to the basestation subsystem (BSS), which connection setup signal is chosen so that it will cause minimal load on the telecommunications system. Examples of such connection setup signals are given below.

Generally speaking, an early uplink radio connection is set up each time it is possible to predict a need for an uplink radio connection. In some cases the need to set up an early UL radio connection is based on a probability calculation for the specific situation. FIGS. 4 and 5 shows examples of situations where it is possible to predict need for an uplink radio connection by transmitting connection setup signals in order to reduce delay in a PoC service of the type shown in FIG. 3.

Figure 1:
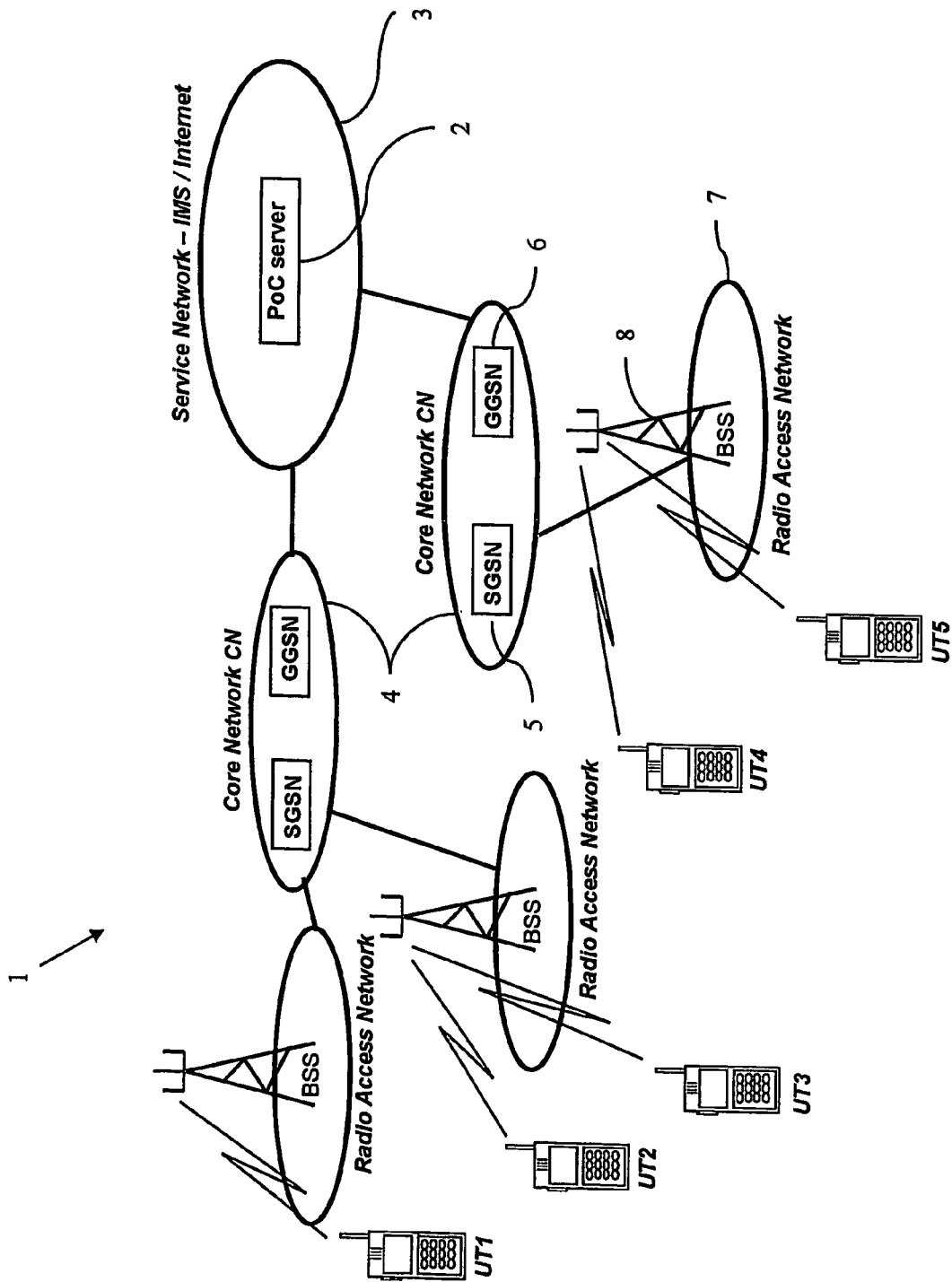
FIG. 1 shows an example of a PoC service architecture in a general telecommunications network.
Figure 2:
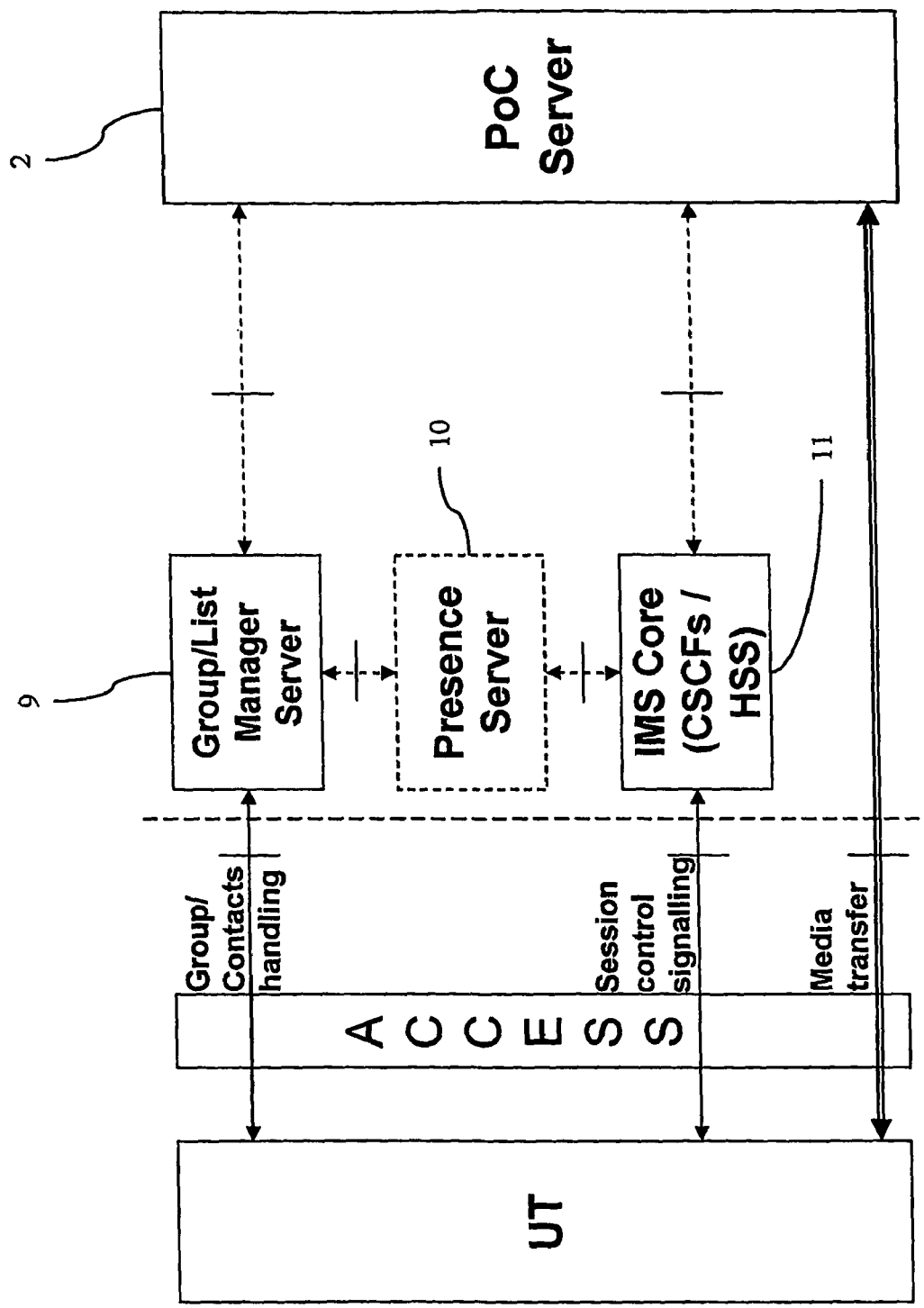
FIG. 2 shows a more detailed architecture of a PoC service.
Figure 3:
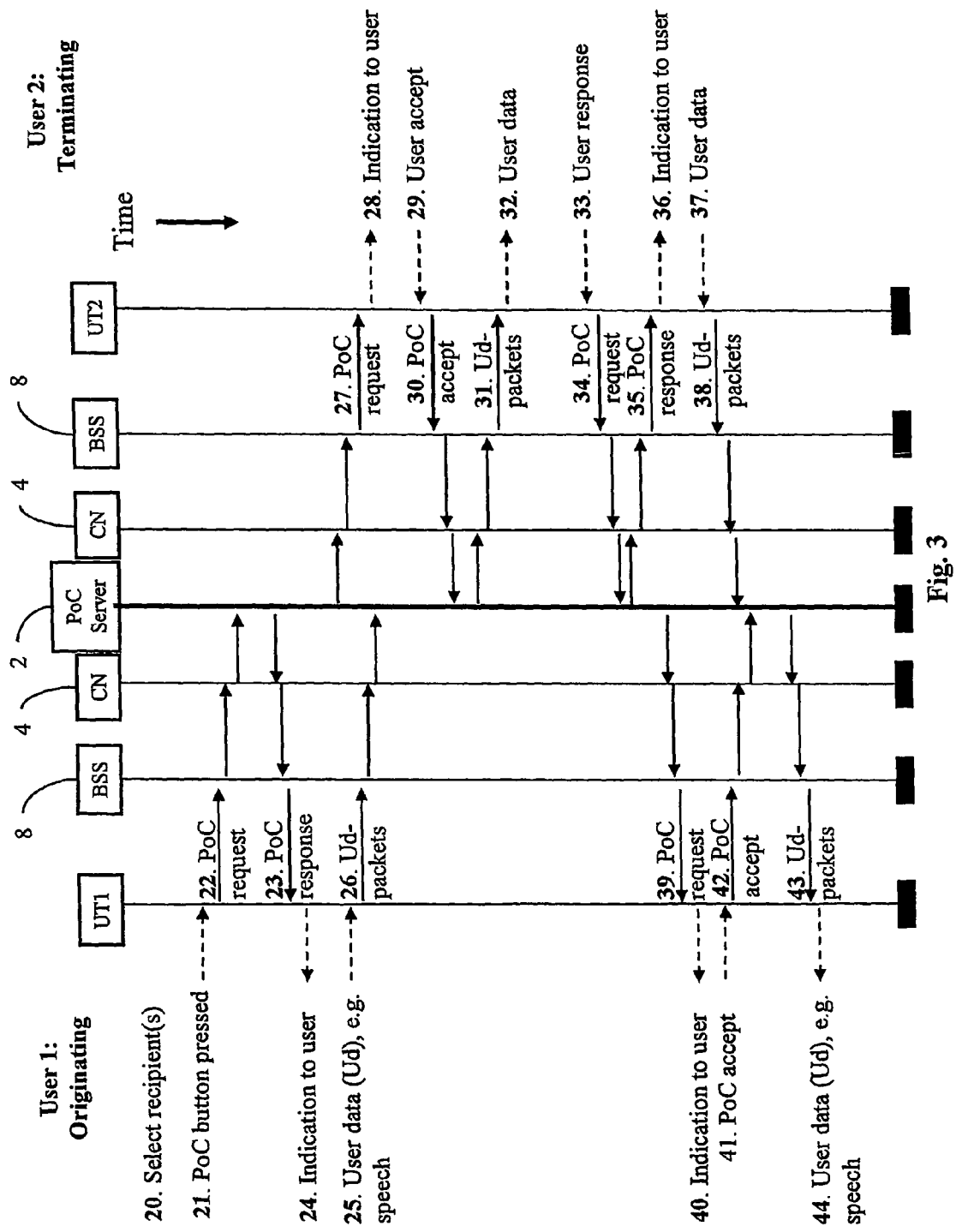
FIG. 3 shows an example of a PoC communication.
Figure 4:
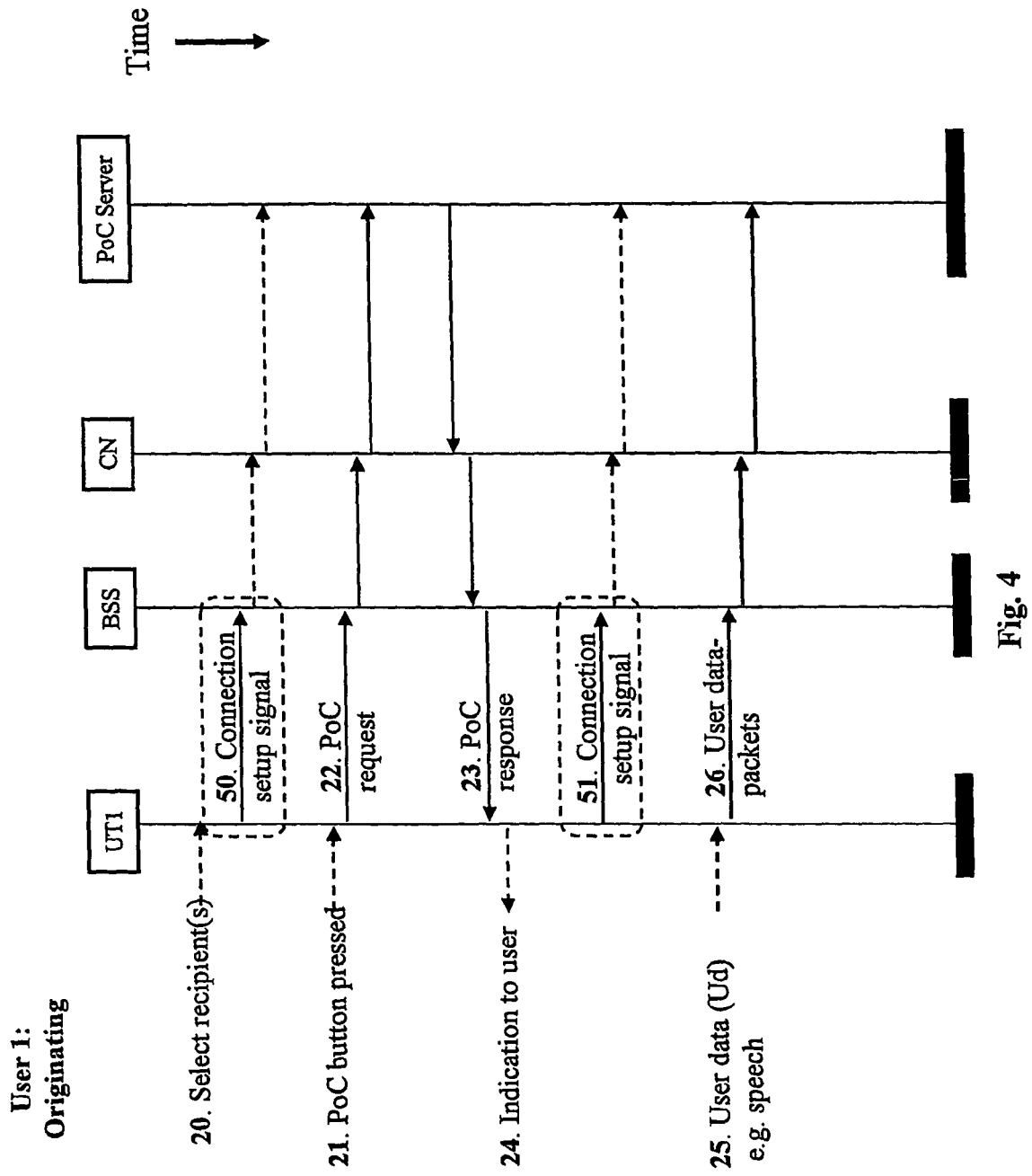
FIG. 4 shows an example embodiment of PoC communication for the originating user.
Figure 5:
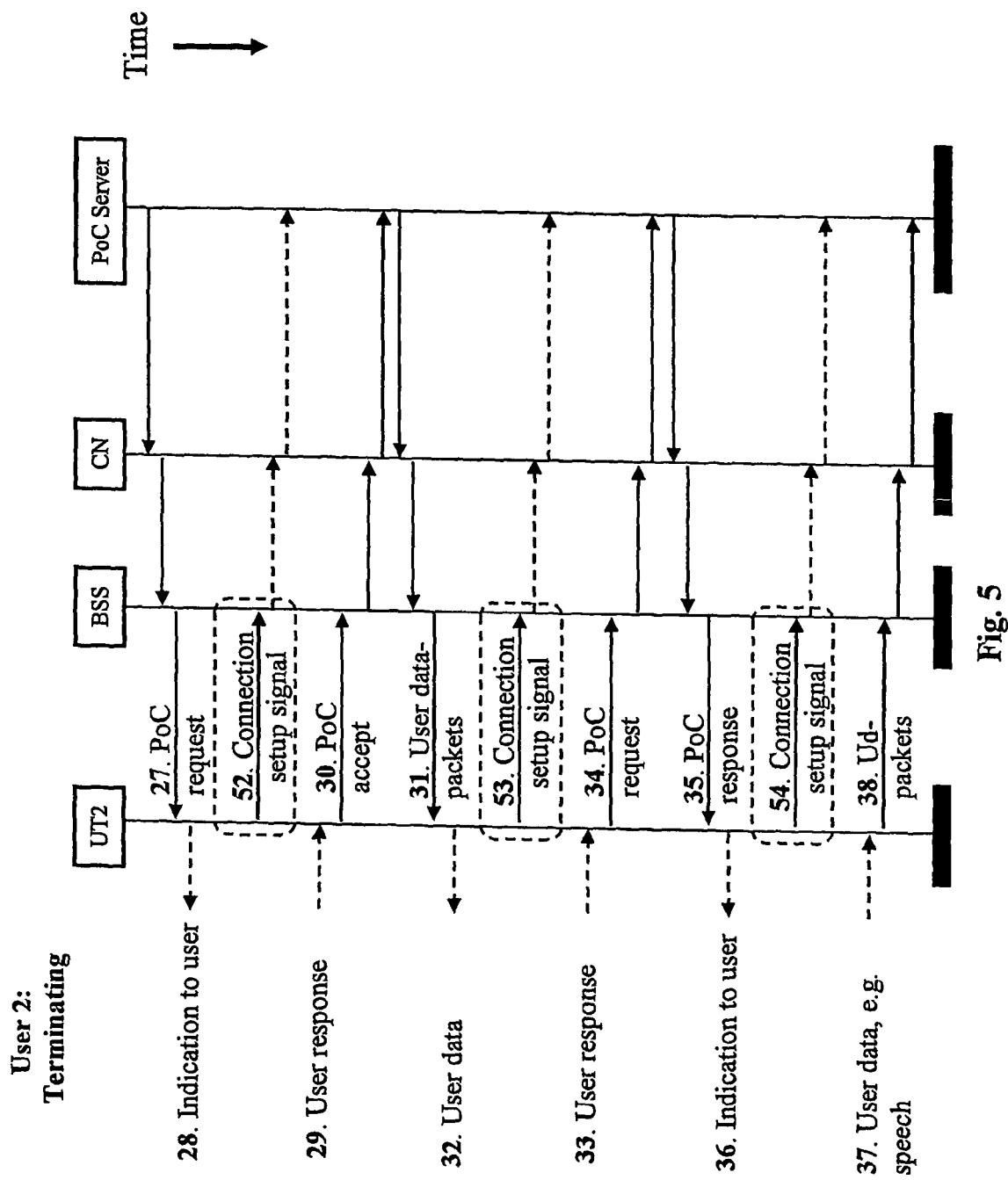
FIG. 5 shows an example of a PoC communication according to the present invention for the terminating user.

FIG. 4 shows the PoC service scheme for the originating user 1 in FIG. 3 (step 20 to 26), wherein two connection setup signals 50 and 51 have been added for setting up an early uplink (UL) radio connection at suitable points in the scheme. To minimize delay for user 1, a connection setup signal 50 is sent from UT1 to the BSS already when the user takes a first action 20 to send a PoC message to another user or a group of users, i.e. it is by this action possible to predict that user 1 probably will initiate a PoC message. This first action may be when user 1 opens his/her PoC contacts list or any other action that has to be performed in order to initiate a new PoC communication such as entering a PoC menu in the terminal interface, and which action takes place before the PoC button is pressed 21. The UL radio connection set up by the connection setup signal 50 is thereafter used for the PoC request 22, which then can be transmitted instantly without the ordinary set up delay. When the PoC request 22 is sent, the UL radio connection may be terminated Thereafter, when UT1 receives a PoC response 23, a second connection setup signal 51 is transmitted from UT1 to the BSS. The PoC response 23 triggers UT1 so as to indicate for user 1 that UT1 is ready to receive user data (Ud) 25, for example speech. Hence, the reception of the PoC response 23 leads to a prediction that user data 25 shortly will be transmitted, whereby the second connection setup signal 51 is transmitted to set up the early uplink radio connection. The user data is thereafter transmitted to the selected terminating user(s) in the form of user data packets 26, over the radio connection set up by the connection setup signal 51, thus avoiding the conventional set up delay. When the last packet of user data has been sent, the radio connection may be terminated in conventional way since no more PoC signals can be expected until one or more of the terminating users reply.

FIG. 5 shows a corresponding PoC service scheme for the terminating user 2 in FIG. 3 (step 27 to 38), wherein three connection setup signals 52, 53 and 54 have been added for setting up an early uplink (UL) radio connection at suitable points in the scheme. In step 27 UT2 receives a PoC request from the PoC server, indicating that e.g. user 1 has sent (or is sending) a PoC message to user 2, and UT2 indicates this to user 2 e.g. by a sound signal. As there, in normal situations, is a great likelihood that user 2 will respond to the indication 28 of a PoC message, UT2 automatically transmitts a connection setup signal 52 to the BSS in order to set up an early uplink (UL) radio connection, which then is used to send the expected PoC response 30 triggered by user response 29. Thus the conventional delay for setting up the UL radio connection in order to send the PoC response 30 is avoided. In the case user 2 decides not to respond to the indication 28, the UL radio connection will be terminated after a predetermined time limit.

In step 31 UT2 receives user data packets with the PoC message from user 1, and the message is delivered to user 2 in step 32. In order to enable sending of an essentially delay free PoC request 34 as user response 33, UT2 sets up an UL radio connection by transmitting a connection setup signal 53 at the end of the reception of user data packets 31. The act of setting up an early UL radio connection at the end of a received PoC message 31 is based on the prediction that most users will respond to a received PoC message, and that the response will be done shortly (or instantly) at the end of the received message. In the case user 2 decides not to respond to the PoC message 32, the UL radio connection will be terminated when a predetermined time limit has elapsed. In order to detect the end of a received PoC message UT2 is provided with a suitable end estimating function capable of estimating an end of a user data packet message 31. The end estimation may be triggered in several ways such as by reception of a terminating packet in the message 31, the state of the speech coding function in the terminal during reception of a PoC voice message, or expiring of an end estimation timer.

In an alternative embodiment the decision to send the connection setup signal 53 is predicted by an estimating function in UT2. The estimating function estimates the probability that the user will send a reply to a received PoC message in each specific situation. In order to do so, the estimating function registers the response characteristics (probability) for user 2.

The response probability may be dependent on parameters such as: originating user, numbers of users in a group message (the reply probability is normally reduced with increasing number of users), time of day, other settings in the UT, position (the reply probability may be low when the user is at work, but high when he/she is at home or vise versa), a user activity factor (a function in UT that registers the user activity of the user during PoC conversations), etc.

The connection setup signal 54 in FIG. 5 corresponds to the connection setup signal 51 in FIG. 4 and therefore it is not discussed in detail.

The technology disclosed herein reduces the experienced PoC service delay, both for the originating user and the terminating user, this is especially true when the PoC conversation is set up and running Applicable scenarios that would benefit the most are personal PoC conversations and PoC chat groups.

The delay reduction that can be achieved is from 100 ms to 400 ms or more. These figures might appear low, but during a conversation, delay reductions of this order are clearly noticeable.

Figure 6:
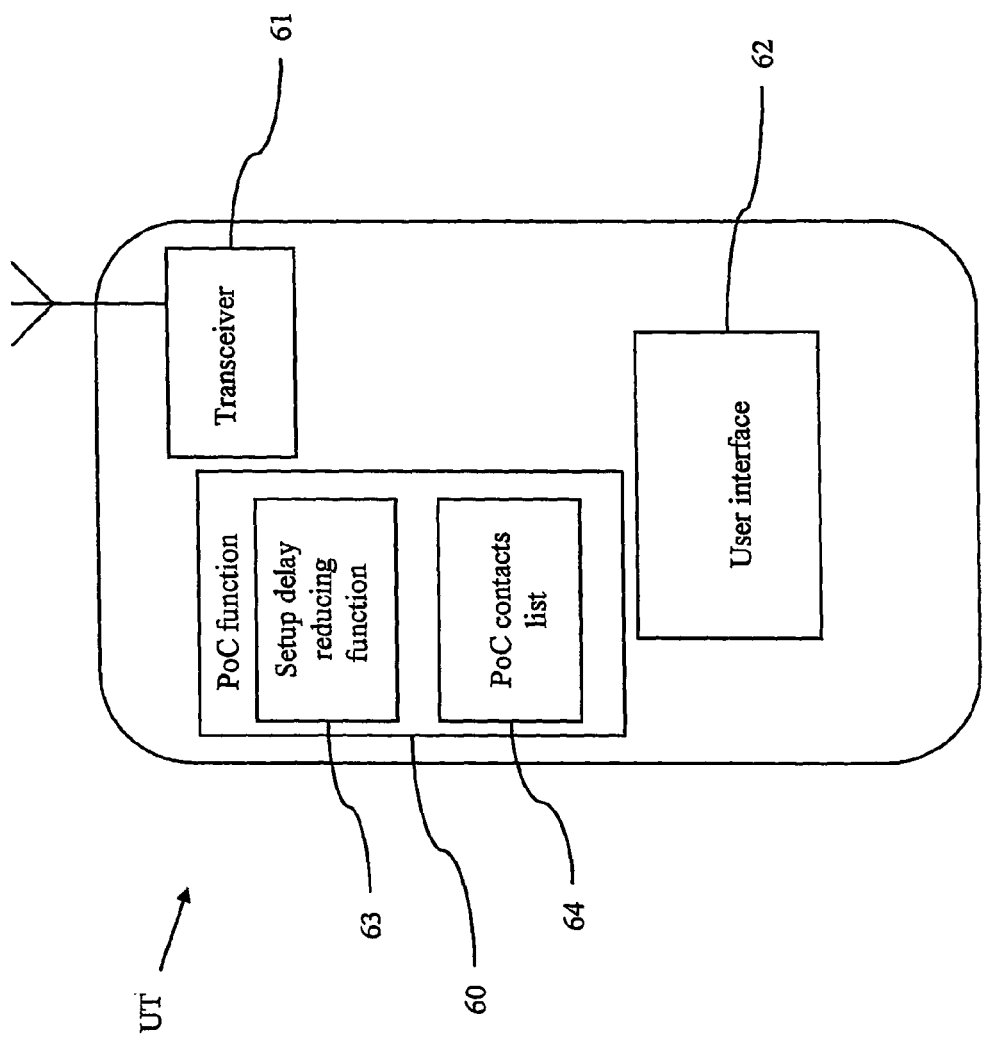
FIG. 6 schematically shows a user terminal according to the present invention.

FIG. 6 schematically shows a user terminal UT comprising a PoC function 60, a transceiver 61 and a user interface 62. The PoC function 60 comprises a PoC contacts list 64, and is arranged to handle the PoC related functions in a radio telecommunications system operating over non dedicated channels. In order to achieve reduced delay times in accordance with the above method(s), the PoC function 60 further comprises a "setup delay reducing function" 63. This delay reducing function 63 is arranged to predict that delay sensitive PoC data is to be transmitted from the user terminal UT and in response to the prediction trigger transmission of a connection setup signal (50, 51, 52, 53, 54) from the user terminal to a basestation subsystem (BSS) to set up an early uplink radio connection.

In the GSM/GPRS telecommunications system the setup of an UL TBF is triggered by placing application data in the sending buffer at the radio layer, the so-called GPRS sending buffer. In contrast to Early setup of DL TBF the terminal cannot setup a connection in the uplink without some application data. To trigger the Early Uplink TBF setup an connection setup signal (IP-packet) is needed.

In the examples below, two solutions for triggering an Early Uplink TBF setup in a GSM/GPRS system are described.

Example 1

Application Control Message (Packet)

The PoC client in the terminal receives RTP media in the DL, 31 in FIG. 5. When the estimating function in the PoC client concludes the end of the talk burst, by discovering that the x-bit of the RTP header is set, by the expiration of an End of talk burst timer, or by reception of an explicit end of talk burst message, it sends an connection setup signal 53 in the form of a RTCP Source Description (SDES) message or/and Receiver Report (RR) message or a compound RTCP message. A RTCP-SDES message contains so called SDES Items, which describes the source of the data, e.g. NAME: the real name of a source e.g. "Anders Andersson". another Item is EMAIL: Electronic mail address SDES item, e.g. "John.doe@nowhere.nu". The RTCP message then triggers the UL TBF setup. The RTCP message should not consume more than 5% of the available session bandwidth, however, the gain of using RTCP as Early UL TBF setup makes it reasonable to loosen this requirement. Further, normally signaling uses lower priority radio bearers, such as the Interactive class bearer, however, the RTCP message used for Early UL TBF setup for the RTP media requires that the TBF being established relates to the radio connection that the RTP media will use, in order to have the RTCP message as an Early UL TBF setup message for the RTP media. If there is a response by the user within a reasonable (configurable) time period (UL TBF prolonging timer period) the radio connection for the RTP IP-packet is already available. The usage of this mechanism in the PoC service is very effective since the RTCP messages are not just forwarded by the PoC server, instead the server will examine the received data and take a decision on whether the information shall be forwarded to the corresponding PoC group members or not. Thus, radio resources are not wasted in the downlinks of other group members. Further, the RTCP message will most likely trigger the TBF characteristics for corresponding RTP media, however Internet Control Message Protocol (ICMP) messages can be used to trigger an Early UL TBF setup for the TBF characteristics of the SIP signaling. When the terminal PoC client receives a SIP message, this triggers an ICMP message, which while the SIP message is processed in the PoC client is passed to the sending buffer at the radio layer. When the processing is done and the SIP message is passed to the sending buffer the UL TBF is already present. To avoid confusion in the receiver of this ICMP message the ICMP Echo Reply Message should be used. As no ICMP messages are sent about ICMP message, unless it is an ICMP Echo Message, this should not cause confusion in the receiver. The receiver of the Echo Reply Message may be the PoC server or any other known host in the path of the terminal PoC server. The data field of the Echo Reply Message should be empty in order not to waste radio resources.

Example 2

Application Media Message (Packet)

The PoC client in the terminal receives RTP media in the DL, 31 in FIG. 5. When the PoC client concludes that the end of the talk burst has been reached, by discovering that the x-bit of the RTP header is set, by the expiration of an End of talk burst timer, or by reception of an explicit end of talk burst message, it sends a RTP packet 53, where the RTP payload table of context field indicates that this RTP packet is a NO_DATA packet, i.e. the FT=15. In order not to waste scarce radio resources in the other group members downlinks, the PoC server should discard these RTP packets in the case that this RTP packet is not part of a current talk burst. This embodiment requires some scanning of RTP messages, at least RTP messages that are not part of a current talk-burst (Not in between m-bit set to x-bit set/or other end of talk burst signals).

Although these examples are intended to be used before the PoC user decides to respond, by pressing the PoC button or by similar means indicating a wish to respond. They may also be used before any user experienced delay sensitive application data is placed into the sending buffer at the radio layer, but after some kind of response indication has been received.

Further, although these solutions are described with respect to the PoC service they shall be taken as applicable to other delay sensitive services and other services' characteristics. In that case the general method would be defined as a method of reducing setup delay in a delay sensitive service in a radio telecommunications system, comprising: predicting that delay sensitive data is to be transmitted, sending, as a response to the prediction, a connection setup signal from the terminal to a basestation subsystem (BSS) to set up an early uplink radio connection, and transmitting the delay sensitive data via the early uplink connection.

Even though it is the RTCP, RTP and ICMP specific messages that are laid forward as connection setup signals in this disclosure, other similar connection setup signals might be used for other different application and services. For example, a "dummy" IP-packet may be used instead of the RTCP message, however this is not recommended as "dummy" IP-packets may cause other IP network control message to waste the scarce radio resources.

LIST OF ABBREVIATIONS

PoC Push-to-talk over Cellular
IToC Instant-Talk-over-Cellular
GSM Global System for Mobile communications
EDGE Enhanced Data rate for GSM Evolution
UMTS Universal Mobile Telecommunications System
CDMA Code Division Multiple Access
CN core network
SGSN Service GPRS Support Node
GGSN Gateway GPRS Support Node
RAN Radio Access Network
BSS Base Station Subsystem
UT1-UT5 User Terminals
IMS IP Multimedia Subsystem core
HSS Home Subscriber Server
CSCF Call Session Control Function
CS Circuit Switched
PS Packet Switched
S-CSCF service CSCF
I-CSCF interrogating CSCF
P-CSCF proxy CSCF
TBF Temporary Block Flow
UL TBF Uplink TBF
DL TBF Downlink TBF
RTP Real Time Transport Protocol
RTCP Real Time Control Protocol
SDES RTCP Source Description
RR Receiver Report
ICMP Internet Control Message Protocol
SIP Session Initiation Protocol

The invention claimed is:

1. A method of reducing setup delay for an uplink message from a user terminal (UT) in a push-to-talk over cellular (PoC) service in a radio telecommunications system, the method comprising:
    sensing an indication of an anticipated push-to-talk over cellular (PoC) transmission from the terminal;
    on basis of the sensed indication the user terminal making a prediction that delay sensitive data is to be transmitted, the delay sensitive data being push-to-talk over cellular (PoC) data;
    sending, in response to the prediction, a connection setup signal from the terminal to a basestation subsystem in order to set up an early uplink radio connection for the push-to-talk over cellular (PoC) transmission; and then
    transmitting the delay sensitive data over the early uplink connection in conjunction with the push-to-talk over cellular (PoC) transmission from the terminal;
    wherein the act of predicting comprises recognizing reception of a push-to-talk over cellular (PoC) response signal allowing the user to transmit a push-to-talk over cellular (PoC) message.

2. The method according to claim 1 wherein the connection setup signal is a signal that causes minimal load on the telecommunications system.

3. The method according to claim 1 wherein the connection setup signal in a GSM/GPRS telecommunications system is a RTCP message.

4. The method according to claim 1 wherein the connection setup signal in a GSM/GPRS telecommunications system is a RTP packet.

5. The method according to claim 4 wherein an RTP payload table of a context field indicates that the RTP packet is a NO_DATA packet.

6. The method according to claim 1 wherein the connection setup signal in a GSM/GPRS telecommunications system is a ICMP packet.

7. The method according to claim 1 further comprising making the prediction prior to the user terminal requesting transmission of the delay sensitive push-to-talk over cellular (PoC) data.

8. The method of claim 1, further comprising sending the connection set up signal before the delay sensitive data is placed into a sending buffer at a radio layer.

9. The method according to claim 1 further comprising transmitting the delay sensitive data over the early uplink connection when a PoC button is activated.

10. The method according to claim 9 wherein the PoC button is either a hardware button or a software controlled button.

11. A method of reducing setup delay for an uplink message from a user terminal (UT) in a push-to-talk over cellular (PoC) service in a radio telecommunications system, the method comprising:
sensing an indication of an anticipated push-to-talk over cellular (PoC) transmission from the terminal;
on basis of the sensed indication the user terminal making a prediction that delay sensitive data is to be transmitted, the delay sensitive data being push-to-talk over cellular (PoC) data;
sending, in response to the prediction, a connection setup signal from the terminal to a basestation subsystem in order to set up an early uplink radio connection for the push-to-talk over cellular (PoC) transmission; and then
transmitting the delay sensitive data over the early uplink connection in conjunction with the push-to-talk over cellular (PoC) transmission from the terminal;
wherein the act of predicting comprises recognizing reception of a push-to-talk over cellular (PoC) request signal indicating that a push-to-talk over cellular (PoC) message is addressed to the terminal.

12. A method of reducing setup delay for an uplink message from a user terminal (UT) in a push-to-talk over cellular (PoC) service in a radio telecommunications system, the method comprising:
sensing an indication of an anticipated push-to-talk over cellular (PoC) transmission from the terminal;
on basis of the sensed indication the user terminal making a prediction that delay sensitive data is to be transmitted, the delay sensitive data being push-to-talk over cellular (PoC) data;
sending, in response to the prediction, a connection setup signal from the terminal to a basestation subsystem in order to set up an early uplink radio connection for the push-to-talk over cellular (PoC) transmission; and then
transmitting the delay sensitive data over the early uplink connection in conjunction with the push-to-talk over cellular (PoC) transmission from the terminal;
wherein the act of predicting comprises estimating end of a received push-to-talk over cellular (PoC) message.

13. A method of reducing setup delay for an uplink message from a user terminal (UT) in a push-to-talk over cellular (PoC) service in a radio telecommunications system, the method comprising:
sensing an indication of an anticipated push-to-talk over cellular (PoC) transmission from the terminal;
on basis of the sensed indication the user terminal making a prediction that delay sensitive data is to be transmitted, the delay sensitive data being push-to-talk over cellular (PoC) data;
sending, in response to the prediction, a connection setup signal from the terminal to a basestation subsystem in order to set up an early uplink radio connection for the push-to-talk over cellular (PoC) transmission; and then
transmitting the delay sensitive data over the early uplink connection in conjunction with the push-to-talk over cellular (PoC) transmission from the terminal;
wherein the act of predicting comprises making an estimation of probability that the user will reply to a received push-to-talk over cellular (PoC) message in each specific situation, the estimation of the reply probability being based on parameters selected from a group of: originating user, numbers of users in a group message, time of day, a setting in the user terminal, position, and a user activity factor.

14. A user terminal for use in a radio telecommunications system, the user terminal comprising:
a communications processor comprising a setup delay reducing function configured to perform the acts of:
sensing an indication of an anticipated push-to-talk over cellular (PoC) transmission from the terminal;
on basis of the sensed indication, making a prediction that delay sensitive data is to be transmitted; and
a transmitter configured to perform acts of:
sending, in response to the prediction, a connection setup signal from the terminal to a basestation subsystem in order to set up an early uplink radio connection for the push-to-talk over cellular (PoC) transmission; and
after sending of the connection setup signal, transmitting the delay sensitive data over the early uplink connection in conjunction with the push-to-talk over cellular (PoC) transmission;
wherein the act of predicting comprises recognizing reception of a push-to-talk over cellular (PoC) response signal allowing the user to transmit a push-to-talk over cellular (PoC) message.

15. The user terminal according to claim 14 wherein the connection setup signal is one of a RTCP message and a RTP packet.

16. The user terminal according to claim 14 wherein the push-to-talk over cellular (PoC) function is arranged to trigger the transmission of the connection setup signal prior to the user terminal requesting transmission of the delay sensitive push-to-talk over cellular (PoC) data.

17. A user terminal according to claim 14, wherein the setup delay reducing function is arranged to send the connection set up signal before the delay sensitive data is placed into a sending buffer at a radio layer.

18. A radio telecommunications system comprising:
at least one user terminal;
a base station subsystem configured to provide a push-to-talk over cellular (PoC) service to the at least one user terminal; and wherein the at least one user terminal comprises:
  a communications processor comprising a setup delay reducing function configured to perform the acts of:
    sensing an indication of an anticipated push-to-talk over cellular (PoC) transmission from the terminal;
    on basis of the sensed indication, making a prediction that delay sensitive data is to be transmitted; and
  a transmitter configured to perform acts of:
    sending, in response to the prediction, a connection setup signal from the terminal to a basestation subsystem in order to set up an early uplink radio connection for the push-to-talk over cellular (PoC) transmission; and
    after sending of the connection setup signal, transmitting the delay sensitive data over the early uplink connection in conjunction with the push-to-talk over cellular (PoC) transmission;
  wherein the act of predicting comprises making an estimation of probability that the user will reply to a received push-to-talk over cellular (PoC) message in each specific situation, the estimation of the reply probability being based on parameters selected from a group of: originating user, numbers of users in a group message, time of day, a setting in the user terminal, position, and a user activity factor.

19. The system according to claim 18, wherein the setup delay reducing function is arranged to send the connection set up signal before the delay sensitive data is placed into a sending buffer at a radio layer.

* * * * *

UNITED STATES PATENT AND TRADEMARK OFFICE
CERTIFICATE OF CORRECTION

PATENT NO. : 7,873,378 B2
APPLICATION NO. : 10/556684
DATED : January 18, 2011
INVENTOR(S) : Schliwa-Bertling et al.

Page 1 of 1

It is certified that error appears in the above-identified patent and that said Letters Patent is hereby corrected as shown below:

On the Face Page, in Field (57), under "ABSTRACT", in Column 2, Line 4, delete "push to talk service (PoC)," and insert -- push-to-talk over Cellular (PoC), --, therefor.

In Column 2, Line 48, delete "U12." and insert -- UT2. --, therefor.

In Column 6, Line 15, delete "running" and insert -- running. --, therefor.

In Column 10, Line 59, in Claim 17, delete "A user" and insert -- The user --, therefor.

Signed and Sealed this
Seventeenth Day of May, 2011

David J. Kappos
*Director of the United States Patent and Trademark Office*